Oct. 13, 1925.
J. BRESLAV
BUMPER
Filed May 28, 1925
1,557,410
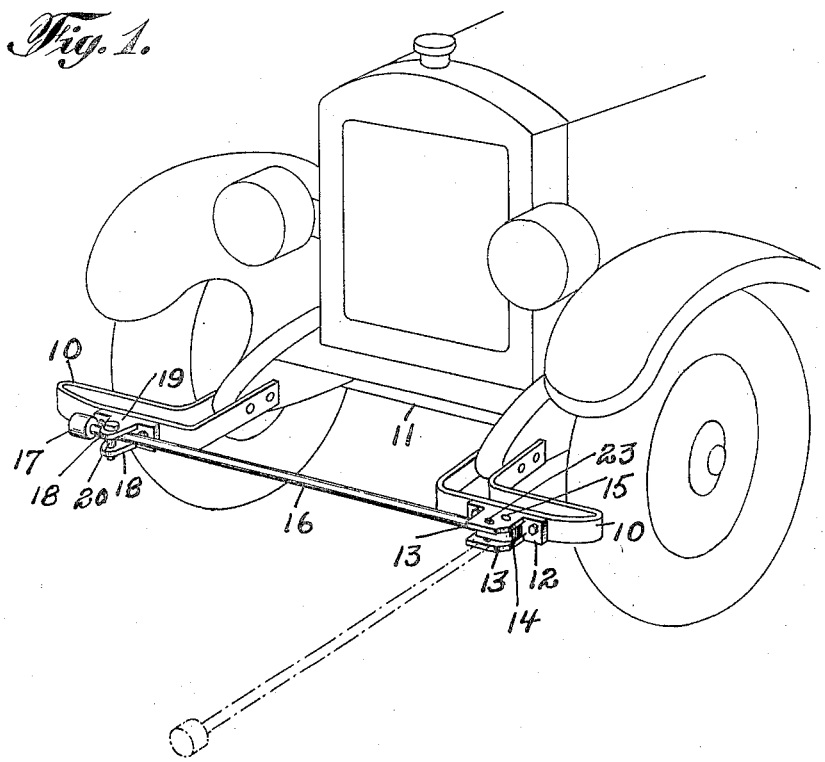
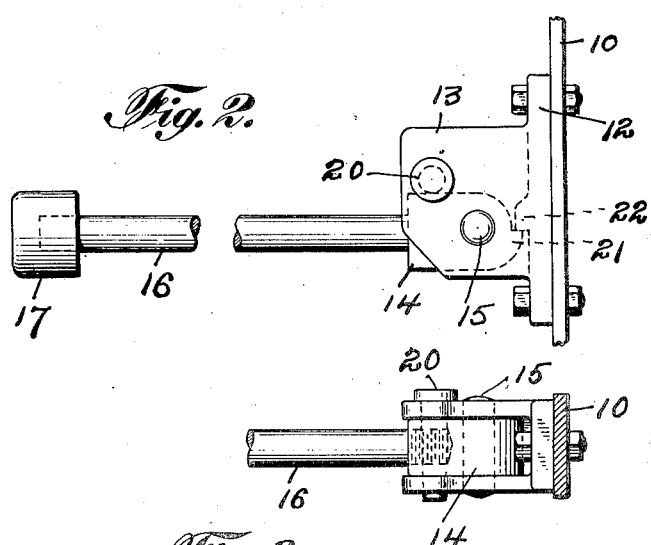
INVENTOR
Jack Breslav
BY
ATTORNEY

Patented Oct. 13, 1925.

1,557,410

UNITED STATES PATENT OFFICE.

JACK BRESLAV, OF NEW HAVEN, CONNECTICUT.

BUMPER.

Application filed May 28, 1925. Serial No. 33,557.

*To all whom it may concern:*

Be it known that I, JACK BRESLAV, a citizen of the United States, residing at New Haven, in the county of New Haven and State of Connecticut, have invented certain new and useful Improvements in Bumpers, of which the following is a specification, reference being had therein to the accompanying drawings.

This invention relates to a new and improved bumper, designed for use upon a motor vehicle.

It is the object of this invention, among other things, to provide a device of this character that will occupy plural positions relatively to the motor vehicle, one of such positions being designed particularly for use when the motor vehicle is at rest, other objects being fewness of parts and simplicity and compactness of structure.

The details and arrangement of parts will be apparent from an inspection of the accompanying drawings in connection with the description hereinafter contained, and wherein a preferred embodiment of the invention is disclosed for the purpose of imparting an understanding of the same.

In the drawings, wherein like reference characters indicate like parts in the several views:

Figure 1 is a perspective view of the forward portion of a motor vehicle with my improved bumper attached thereto;

Figure 2 is an enlarged fragmentary plan view thereof; and

Figure 3 is a similar end view.

A motor vehicle parked on a public street or a place where cars are assembled is frequently damaged by other cars backing into or against it and is parked so closely that it is impossible to move from the parking place until the adjacent car or cars have shifted from their positions.

With my improved bumper a temporary extension may be provided that will prevent the adjacent car backing into the parked car and will limit its approach to such distance as will enable the parked car to readily move from its parked position without moving the adjacent car.

In the drawings, my improved mechanism is shown as applied to the front of a motor vehicle but it may be applied to the rear equally as well.

In the drawings, 10 designates single bumpers of a well known type and structure attached in any convenient manner to a motor vehicle 11.

Fixed to one of the single bumpers 10 is a base plate 12, having ears 13 integral therewith, between which is pivoted a swivel block 14 by the pintle 15, in which is threaded a rod 16, having a rubber head 17 fixed to the outer end thereof.

In Figure 1 the bumper is shown with the rod 16 positioned substantially parallel with the front of the car, in which position it lies between the ears 18, integral with the base plate 19, secured to the other of the single bumpers 10, and projecting through these ears and outside of the rod is a removable pin 20 which prevents the disengagement of the rod from the base plate. The position of this rod may be changed so that it will be at an angle to its former or full line position. This latter position is shown by broken lines in Figure 1, and by full lines in Figure 2. When so positioned the lug 21 upon the swivel block 14, engages the stop lug 22 on the base plate 12.

Before the rod is moved upon its pivot mounting the pin 20 is lifted out from the ears 18 and when the rod has been moved into its new position, this pin is inserted in the opening 23 in the ears 13 and thus holds the rod against movement.

When so positioned, no other car can approach nearer than the rubber head 17, thus preventing injury to the parked car and insuring sufficient space for the car to leave its parking place without disturbing the position of adjacent cars.

As herein shown, my mechanism is connected with a two-part bumper, in which case the rod 16 serves as an intermediate bumper when in the position shown by full lines in Figure 1, but may be attached to a single type bumper if so desired.

What I claim as new and desire to secure by Letters Patent is:—

1. In a bumper; companion base plates; and a rod movably connected with one of the plates, said rod functioning as a bumper in both its open and closed positions.

2. A motor vehicle and a bumper having a movable connection therewith that projects forwardly from the other portions of the bumper and in such position increases the zone of operation of the bumper as a bumper.

3. In a bumper, fixed companion plates; a rod; and means as a removable member attachable to either of said plates whereby the rod is held against movement in its plural positions.

4. In a bumper, companion plates, each having an opening therein; a pin that may be inserted in either of said openings; and a rod pivotally connected with one of the plates and in one of its positions engaging the other plate.

5. In a bumper, a base plate having stop means connected therewith; a block connected with the base plate, and having a part thereon that engages the stop member in one of its positions; a rod connected with the cam block; and a second base plate shaped so as to receive the rod in one of its positions.

6. A bumper for a motor vehicle movable relatively to the motor vehicle so that it may occupy a position either substantially parallel with the front of the motor vehicle or at an angle thereto and function as a bumper in both of such positions.

In testimony whereof, I have hereunto affixed my signature.

JACK BRESLAV.